United States Patent
Sturm et al.

(10) Patent No.: US 11,448,118 B2
(45) Date of Patent: Sep. 20, 2022

(54) TWO-STAGE TURBOCHARGED INTERNAL COMBUSTION ENGINE

(71) Applicant: Caterpillar Motoren GmbH & Co. KG, Kiel (DE)

(72) Inventors: Michael Sturm, Neuwittenbeck (DE); Markus Krueger, Weede (DE); Torben Gravert, Gettorf (DE); Jan Borchardt, Kiel (DE); Udo Wachtel, Schwedeneck (DE); Helge Seidel, Kiel (DE); Volker Abraham, Kiel (DE); Ole Ehlert, Tuettendorf (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 0 days.

(21) Appl. No.: 17/273,146

(22) PCT Filed: Aug. 30, 2019

(86) PCT No.: PCT/EP2019/025287
§ 371 (c)(1),
(2) Date: Mar. 3, 2021

(87) PCT Pub. No.: WO2020/048636
PCT Pub. Date: Mar. 12, 2020

(65) Prior Publication Data
US 2021/0348547 A1     Nov. 11, 2021

(30) Foreign Application Priority Data
Sep. 4, 2018  (GB) ...................................... 1814335

(51) Int. Cl.
*F02B 29/04*     (2006.01)
*F02B 37/013*    (2006.01)

(52) U.S. Cl.
CPC ...... *F02B 29/0412* (2013.01); *F02B 29/0475* (2013.01); *F02B 37/013* (2013.01)

(58) Field of Classification Search
CPC . F02B 29/0412; F02B 29/0475; F02B 37/013
(Continued)

(56) References Cited

U.S. PATENT DOCUMENTS 2,401,677 A * 6/1946 Yingling ................. F02B 37/04
                                                123/562
4,062,188 A * 12/1977 Cutler ................. F02B 29/0425
                                                60/599
(Continued)

FOREIGN PATENT DOCUMENTS

| AT | 6051 U1 | 3/2003 |
| CN | 102979616 A | 3/2013 |

(Continued)

OTHER PUBLICATIONS

International Search Report related to PCT Application No. PCT/EP2019/025287 dated Dec. 4, 2019.
(Continued)

*Primary Examiner* — Shafiq Mian (57) ABSTRACT

A two-stage turbocharged internal combustion engine comprises a low-pressure stage turbocharger mounted at a first end side of an engine block and a high-pressure stage turbocharger mounted at the same first end side of the engine block. The respective turbochargers are mounted via a mounting structure, Which also accommodates the charge air coolers associated with the turbochargers. In order to obtain a compact arrangement and reduce a length of pipe connections between the different components, the different charge air coolers are mounted to mounting structure such that they overlap in a plan view of the internal combustion (Continued)

engine. Further, flow directions of charge air in the different charge air coolers are opposite to each other.

13 Claims, 4 Drawing Sheets (58) Field of Classification Search
USPC .................................. 60/599, 612; 123/562
See application file for complete search history.

(56) References Cited

U.S. PATENT DOCUMENTS

| | | | | |
|---|---|---|---|---|
| 4,638,634 | A * | 1/1987 | McLean | F02B 37/007 |
| | | | | 60/612 |
| 5,109,674 | A * | 5/1992 | Sudmanns | F02B 37/013 |
| | | | | 60/612 |
| 5,564,275 | A * | 10/1996 | Codan | F02B 37/013 |
| | | | | 60/612 |
| 5,697,217 | A * | 12/1997 | Ramsden | F02B 37/013 |
| | | | | 60/612 |
| 6,782,849 | B2 * | 8/2004 | Roithinger | F02B 29/0412 |
| | | | | 123/41.56 |
| 8,234,864 | B2 * | 8/2012 | Easley, Jr. | F02B 37/013 |
| | | | | 60/612 |
| 8,397,503 | B2 * | 3/2013 | Niwa | F02B 37/013 |
| | | | | 60/612 |
| 8,978,359 | B2 | 3/2015 | Schlemmer-Kelling | |
| 9,599,012 | B2 * | 3/2017 | Jayakar | F02B 29/0412 |
| 9,777,619 | B2 * | 10/2017 | Hibino | F01D 25/12 |
| 2003/0150408 | A1 | 8/2003 | Roithinger | |
| 2011/0030662 | A1 * | 2/2011 | Zitzler | F02B 29/0412 |
| | | | | 123/568.12 |
| 2014/0060039 | A1 * | 3/2014 | Powers | F04D 29/584 |
| | | | | 60/599 |
| 2014/0318119 | A1 * | 10/2014 | Svihla | F02B 29/0412 |
| | | | | 60/599 |
| 2014/0318120 | A1 | 10/2014 | Svihla | |
| 2016/0252008 | A1 * | 9/2016 | Hamaoka | F02B 37/013 |
| | | | | 60/599 |
| 2016/0265419 | A1 * | 9/2016 | Pelei | F02B 29/045 |
| 2017/0022884 | A1 * | 1/2017 | Takahata | F02B 29/0412 |

FOREIGN PATENT DOCUMENTS

| | | | |
|---|---|---|---|
| CN | 203098039 U | 7/2013 | |
| DE | 102004041166 | 4/2005 | |
| DE | 202010007768 U1 | 8/2010 | |
| DE | 212012000031 U1 | 8/2013 | |
| EP | 2751407 B1 | 9/2015 | |
| EP | 3064737 A1 | 9/2016 | |
| WO | 2009147286 A1 | 12/2009 | |
| WO | WO-2012163510 A1 * | 12/2012 | ............ F02B 37/013 |
| WO | 2015055891 A1 | 4/2015 | |
| WO | 2017134333 A1 | 8/2017 | |

OTHER PUBLICATIONS

Great Britain Search Report related to Application No. 1814335.4 dated Mar. 6, 2019.

* cited by examiner

TWO-STAGE TURBOCHARGED INTERNAL COMBUSTION ENGINE

This patent application is a 35 USC § 371 U.S. national stage of International Application No. PCT/EP2019/025287 filed on Aug. 30, 2019, which claims the benefit and priority of Great Britian Application No. 1814335.4 filed on Sep. 4, 2018, the disclosures of which are incorporated in their entirety by reference herein.

TECHNICAL FIELD

The present disclosure generally relates to a two-stage turbocharged internal combustion engine, and more particularly to a configuration of a two-stage turbocharger system of such an internal combustion engine.

BACKGROUND

For medium speed internal combustion engines, two-stage turbocharger systems having a low-pressure stage turbocharger and a high-pressure stage turbocharger can be used to compress the charge air being supplied to the combustion chambers. The turbocharger systems can be mounted to an engine block and, accordingly, may be exposed to vibrations caused by the operating engine.

WO 2012/163510 A1 discloses a turbocharged internal combustion engine with a two-stage turbocharger system, wherein a low-pressure stage turbocharger and a high-pressure stage turbocharger are mounted on opposite end sides of an engine block of the internal combustion engine.

The present disclosure is directed, at least in part, to improving or overcoming one or more aspects of prior systems.

SUMMARY OF THE DISCLOSURE

According to an aspect of the present disclosure, an internal combustion engine comprises an engine block extending along a longitudinal direction and having a first end side and a second end side opposite to the first end side in the longitudinal direction. The internal combustion engine further comprises a two-stage turbocharger system comprising a low-pressure stage turbocharger and a high-pressure stage turbocharger. The low-pressure stage turbocharger is mounted at the first end side of the engine block and comprises a first turbine and a first compressor configured for pre-compressing charge air during operation of the internal combustion engine. The high-pressure stage turbocharger is mounted at the first end side of the engine block and comprises a second turbine and a second compressor configured for compressing the pre-compressed charge air during operation of the internal combustion engine. A first charge air cooler is fluidly connected to an outlet of the first compressor and an inlet of the second compressor, and a second charge air cooler is fluidly connected to an outlet of the second compressor. The first charge air cooler and the second charge air cooler are mounted at the first end side of the engine block so as to overlap at least partially in a plan view of the internal combustion engine. Other features and aspects of this disclosure will be apparent from the following description and the accompanying drawings.

DETAILED DESCRIPTION

The following is a detailed description of exemplary embodiments of the present disclosure. The exemplary embodiments described herein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure may be based in part on the realization that mounting each of the turbocharger stages of a two-stage turbocharger system on opposite end sides of an engine block as a vibration source may result in an increased amplitude of vibrations of the turbocharger system caused by vibrations of the engine during operation, and thereby may produce a mechanical stress on the turbocharger stages. Accordingly, it has been realized that an arrangement of both turbocharger stages on the same end side of the engine block may lead to an optimum center of gravity and/or weight distribution of the turbocharger system, and may reduce the amplitude of vibrations of the turbocharger system during operation of the engine.

Further, the present disclosure is based at least in part on the realization that the arrangement of both stages of the two-stage turbocharger system on the same end side of the engine block allows for a compact arrangement of the components and reduces the length of pipe connections between the same. In particular, it has been realized that the length of the pipe connections can be minimized when the two charge air coolers are arranged in a stack arrangement so as to overlap at least in part in a plan view of the internal combustion engine.

In addition, the present disclosure is based in part on the realization that the provision of a mounting structure including a rack for receiving the respective charge air cooler allows for an easy installation of the same on the end side of the engine block. In addition, the respective turbochargers can easily be mounted on top of such a mounting structure, for example, also overlapping the charge air coolers in the plan view of the internal combustion engine.

In addition, the present disclosure is also based on the realization that a symmetric arrangement of a pair of turbocharger systems for a V-type internal combustion engine further optimizes the center of gravity and/or weight distribution. In this respect, it has also been realized that, in some cases, it is advantageous to arrange, for example, the high-pressure stage turbochargers at different heights so as to overlap the same when viewed in the plan view of the internal combustion engine. This can reduce the total width of the two-stage turbocharger system for such a V-type internal combustion engine.

Finally, the present disclosure is also based on the realization that an arrangement of the respective charge air coolers of the two-stage turbocharger system such that the flow of charge air through the low-pressure stage charge air cooler is away from the engine block and the flow of charge air through the high-pressure stage charge air cooler is towards the engine block is particularly advantageous and facilitates introduction of the compressed charge air into the cylinders of the internal combustion engine.

Exemplary embodiments of a two-stage turbocharged internal combustion engine are described in the following with reference to FIGS. 1 to 4.

An internal combustion engine 1 comprises an engine block 10, a two-stage turbocharger system 12, a fuel tank, one or more catalysts, and an engine control unit (not shown). Engine block 10 includes a crankcase within which a crankshaft 14 is supported. Crankshaft 14 is indicated by a dashed line in FIG. 1. Crankshaft 14 is connected to pistons (not shown), which may be movable within respective cylinders 16A to 16F during operation of the engine.

Engine block 10 as illustrated has end sides 18 and 19 being opposite to each other in a longitudinal direction L defined by crankshaft 14. Engine block 10 further has long sides 20A and 20B being opposite to each other in a transverse direction X (see FIG. 2) orthogonal to the longitudinal direction L of crankshaft 14.

An intake manifold 22 extends, for example, along the long side 20A of engine block 10 and is fluidly connected to each of cylinders 16A to 16F. Each of cylinders 16A to 16F is provided with at least one inlet valve (not shown), which is adapted to open or close the fluid connection between intake manifold 22 and a combustion chamber of the respective cylinder.

At long side 20B, for example, an exhaust manifold 24 is provided, which is connected to each of cylinders 16A to 16F. Each of cylinders 16A to 16F is provided with at least one exhaust valve (not shown) configured to open and close the fluid connection between the combustion chambers of respective cylinders 16A to 16F and exhaust manifold 24.

Generally, when engine 1 is operated, charge air is be introduced into cylinders 16A to 16F through intake manifold 22. After combustion, exhaust gas generated by the combustion process is released from cylinders 16A to 16F through exhaust manifold 24.

Two-stage turbocharger system 12 comprises a low-pressure stage turbocharger 26 and a high-pressure stage turbocharger 28, the turbochargers 26 and 28 forming a sequential turbocharger system.

Generally, turbochargers are applied to use the heat and pressure of the exhaust gas of an engine to drive a compressor for compressing the charge air for the engine. Specifically, exhaust gas passing a turbine of a turbocharger rotates the turbine, thereby decreasing in pressure and temperature. A compressor of the turbocharger is rotatably connected via a common shaft with the turbine and driven by the turbine in a known manner.

At end side 18, low-pressure stage turbocharger 26 is fixedly attached to engine block 10, e.g. directly or as a unit in combination with other components such as coolant blocks etc. Low-pressure stage turbocharger 26 comprises a compressor $C_L$ and a turbine $T_L$ that are mechanically connected via a common shaft $S_L$.

Also at end side 18, high-pressure stage turbocharger 28 is fixedly attached to engine block 10, e.g. directly or as a unit in combination with other components such as coolant blocks etc. High-pressure stage turbocharger 28 comprises a compressor $C_H$ and a turbine $T_L$ that are connected via a common shaft $S_H$.

An inlet of compressor $C_L$ is configured to suck in charge air for the combustion process. Generally, an outlet of compressor $C_L$ is fluidly connected via a compressor connection 34 with an inlet of compressor $C_H$. In particular, the outlet of compressor $C_L$ is connected via a first charge air cooler 30 to an inlet of compressor $C_H$. Then, an outlet of compressor $C_H$ is connected via a second charge air cooler 32 to intake manifold 22, which is configured to distribute the charge air to cylinders 16A to 16F. Thus, the charge air provided for the combustion process is compressed prior to introduction into the engine cylinders using two-stage turbocharger system 12.

During operation of engine 1, the charge air is accordingly compressed twice and cooled before being supplied to cylinders 16A to 16F. Within cylinders 16A to 16F, further compression and, thereby, heating of the charge air is caused through the movement of the pistons. Then, an appropriate amount of fuel, e.g. gaseous fuel, diesel oil, marine diesel oil, heavy fuel oil or a mixture thereof, is injected into cylinders 16A to 16F. Therein, the fuel is combusted with the compressed charged air and produces exhaust gases, which are discharged via exhaust manifold 24.

For medium speed large internal combustion engines, compressor $C_L$ may compress the charge air to 4-5 bar at 200° C. Charge air cooler 30 may cool the charge air from about 200° C. to 45° C. Compressor $C_H$ may compress the charge air to 6-8 bar at 200° C. and charge air cooler 32 may cool the charge air from about 200° C. to 45° C. After combustion, the exhaust gas may have a pressure of about 5 to 6 bar at a temperature in the range of about 500° C. to 550° C. Within a turbine connection 35 between turbine $T_H$ and turbine $T_L$ the pressure drops to 3-4 bar, and a temperature is in the range of about 430° C. to 480° C. After turbine $T_L$ the temperature may be in the range of or below 320° C.

An outlet of exhaust manifold 24 is connected to an inlet of turbine $T_H$. An outlet of turbine $T_H$ is fluidly connected with an inlet of turbine $T_L$ via turbine connection 35, and an outlet of turbine $T_L$ releases the exhaust gas to, for example, a secondary exhaust filtering system or directly into the environment.

The above described cycle may be repeated continuously as the engine continues to run, thereby generating vibrations through the combustion itself and the movement of the pistons and crankshaft.

During operation of engine 1, compressors $C_L$ and $C_H$ may be driven by turbines $T_L$ and $T_H$ in a controlled manner as the amount of exhaust gas provided to turbine $T_H$ may be controlled, for example, via a valve provided in a valve connection fluidly connecting exhaust manifold 24 and turbine connection 35.

Figure 1:
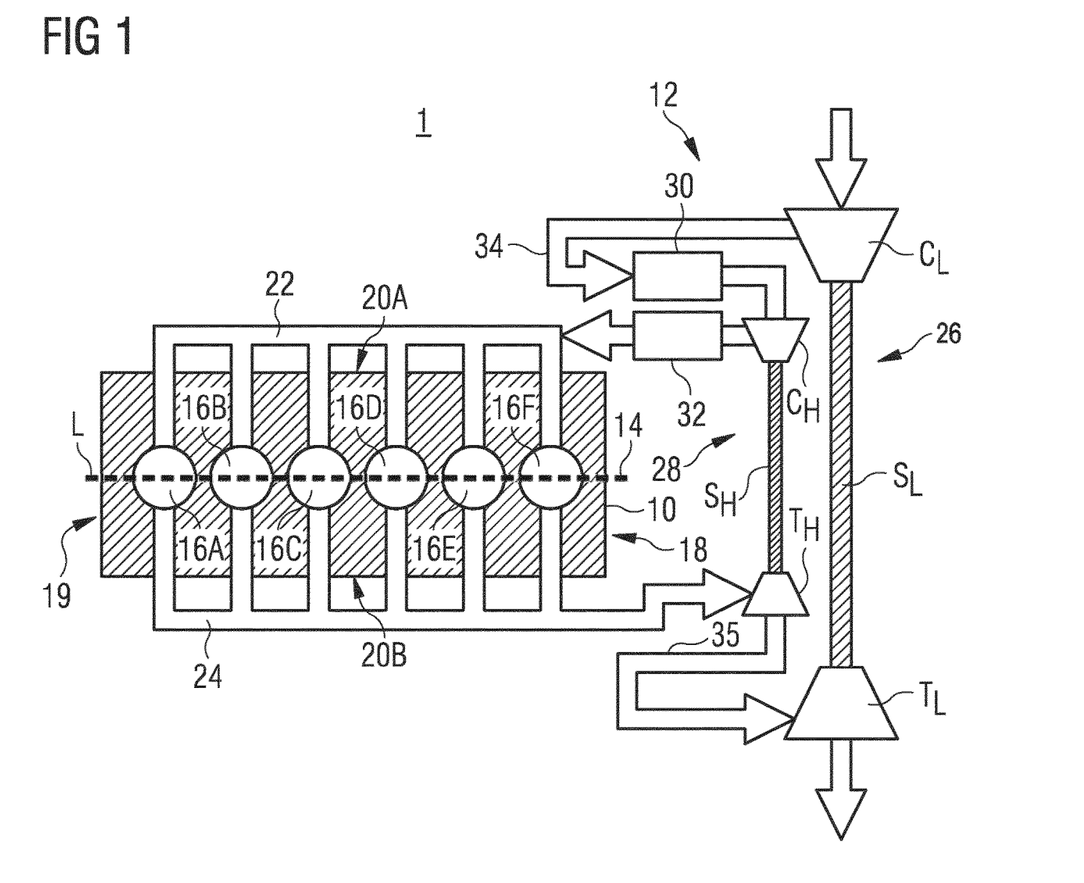
FIG. 1 is a schematic view of an internal combustion engine with a two-stage turbocharger system in accordance with the present disclosure.
Figure 2:
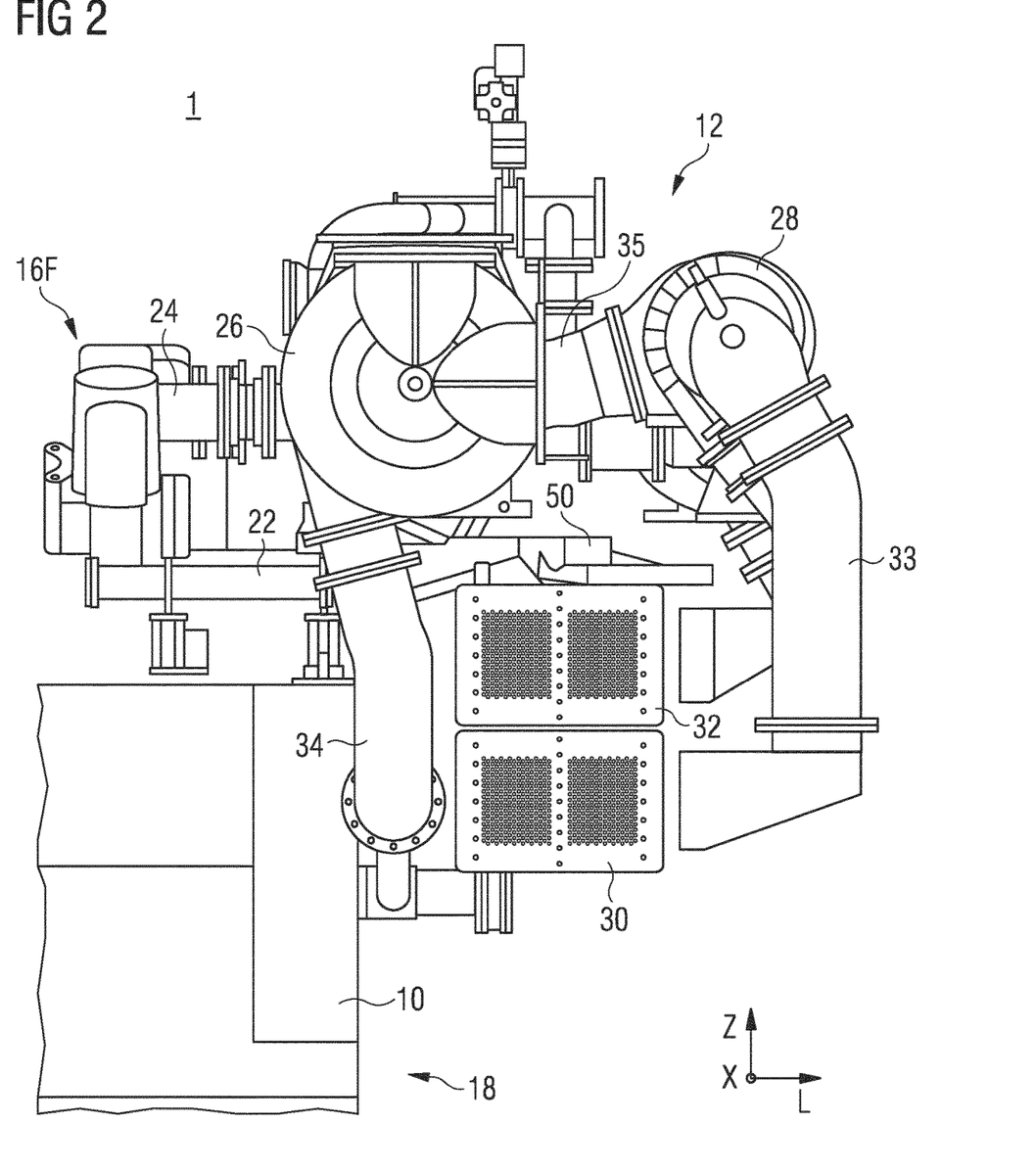
FIG. 2 is a schematic side view of a two-stage turbocharger system in accordance with the present disclosure.

FIG. 2 shows a schematic side view of two-stage turbocharger system 12 in accordance with the present disclosure.

As shown in FIG. 2, two-stage turbocharger system 12 is mounted at first end side 18 of engine block 10 via a mounting structure 50 mounted at first end side 18 of engine block 10.

In particular, as shown in FIG. 2, first charge air cooler 30 and second charge air cooler 32 are mounted at first end side 18 of engine block 10 so as to overlap in a plan view of internal combustion engine 1. In the exemplary embodiment shown in FIG. 2, first charge air cooler 30 and second charge air cooler 32 are aligned with each other so as to fully overlap. It will be readily appreciated, however, that in other embodiments first charge air cooler 30 and second charge air cooler 32 may only overlap partially, if desired. In some embodiments, mounting structure 50 includes a rack 52 (see FIG. 3) configured to receive first charge air cooler 30 and second charge air cooler 32 from the side of mounting structure 50 opposite to first end side 18 of engine block 10. Accordingly, charge air coolers 30, 32 can be easily installed on engine block 10 via rack 52. In particular, charge air cooler 30, 32 can be positioned with respect to other components of two-stage turbocharger system 12, for example, low-pressure stage turbocharger 26 and/or high-pressure stage turbocharger 28.

As shown in FIG. 2, an outlet of low-pressure stage turbocharger 26, in particular, an outlet of the first compressor $C_L$ of the same, is connected to an inlet of first charge air cooler 30 via compressor connection 34, which extends substantially downwards from low-pressure stage turbocharger 26. An outlet of first charge air cooler 30 is connected to an inlet of high-pressure stage turbocharger 28 via a compressor connection 33, which extends substantially upwards from the outlet of first charge-air cooler 30. Likewise, an outlet of high-pressure stage turbocharger 28, in particular, second compressor $C_H$ of the same, is fluidly connected to an inlet of second charge air cooler 32 on the side that is opposite to end side 18 of engine block 10. The compressed charge air exiting second charge air cooler 32 is provided to intake manifold 22 and supplied to cylinders 16A-16F of internal combustion engine 1.

In the exemplary embodiment shown in FIG. 2, second charge air cooler 32 is disposed above first charge air cooler 30. Further, a flow direction of the pre-compressed charge air in first charge air cooler 30 is opposite to the flow direction of the compressed charge air in second charge air cooler 32. In the example shown in FIG. 2, a flow direction of the pre-compressed charge air in first charge air cooler 30 is away from engine block 10, and a flow direction of the compressed charge air in second charge air cooler 32 is towards engine block 10. As will be discussed in more detail below with respect to FIG. 3, each of the first charge air cooler 30 and the second charge air cooler 32 includes a box-shaped housing 55 with a long side extending in transverse direction X. Charge air coolers 30, 32 may be configured in a known manner, and a detailed configuration of the same will not be described herein.

According to the present disclosure, at least one of low-pressure stage turbocharger 26 and high-pressure stage turbocharger 28 extends substantially perpendicular to longitudinal direction L, i.e., in the transverse direction X. In the exemplary embodiment shown in FIG. 2, both low-pressure stage turbocharger 26 and high-pressure stage turbocharger 28 (i.e. their respective axes) extend in the transverse direction X.

As shown in FIG. 2, with the mounting arrangement of charge air coolers 30, 32 and low-pressure stage turbocharger 26 and high-pressure stage turbocharger 28 on mounting structure 50, a compact arrangement can be obtained. In particular, the length of compressor connections 33, 34 can be reduced, and the length of turbine connection 35 between turbine $T_H$ and turbine $T_L$ can also be kept to a minimum. In addition, it will be readily appreciated that, with the arrangement shown in FIG. 2, the two-stage turbocharger system 12 is arranged essentially at one end of engine block 10, namely, the end of the same that is opposite to the end where the flywheel (not shown) is provided. Therefore, vibrations of the two-stage turbocharger system caused by vibrations of engine block 10 during operation of internal combustion engine 1 can be reduced.

It will be readily appreciated that the advantages described above can be obtained for any given type of internal combustion engine, for example, an inline engine with a single row of cylinders, but also for a V-type internal combustion engine with two rows of cylinders extending in parallel along the longitudinal direction L. A corresponding exemplary embodiment will be described in the following with respect to FIG. 3.

Figure 3:
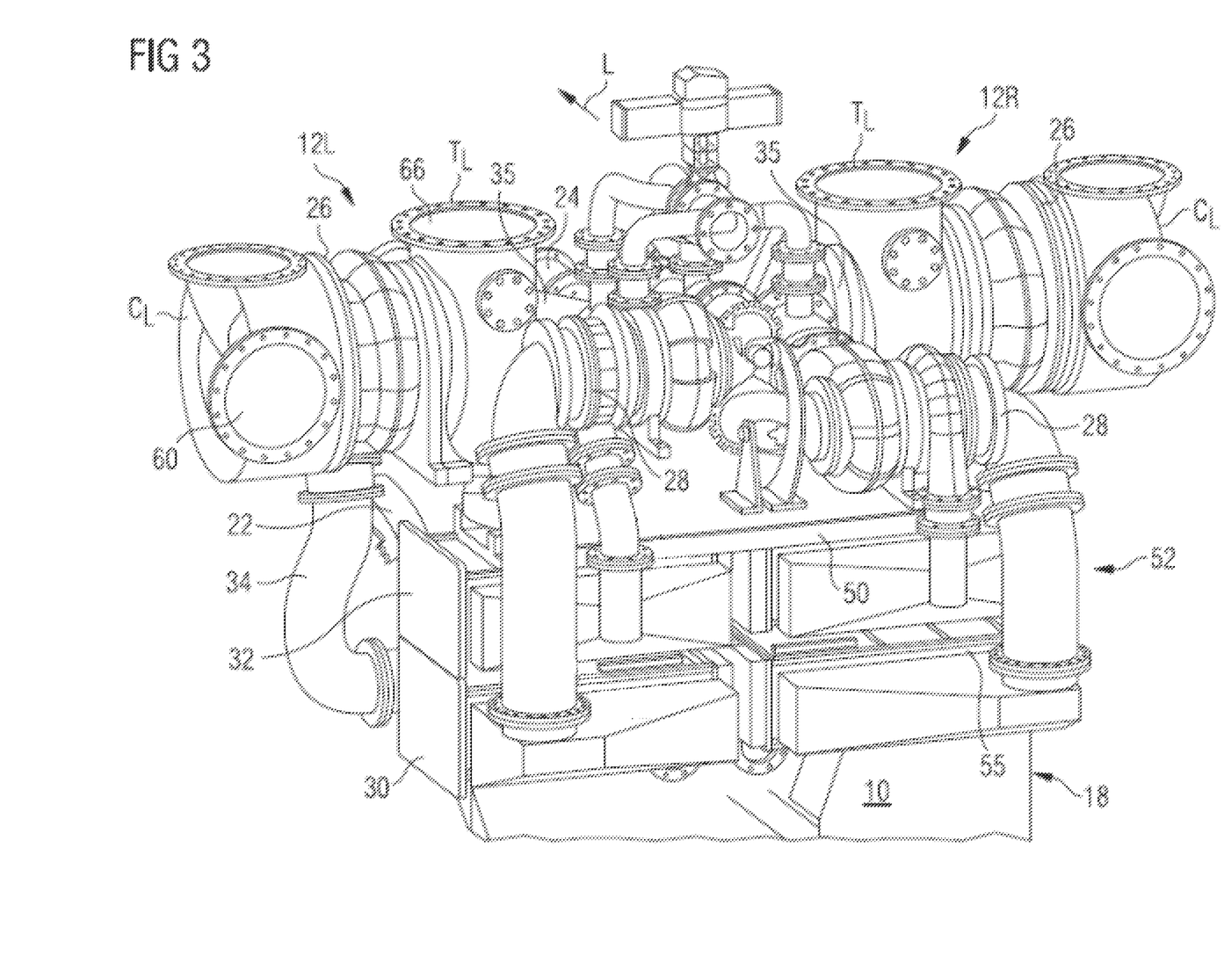
FIG. 3 is a schematic perspective view of a two-stage turbocharger system in accordance with the present disclosure.

As shown in FIG. 3, in case of a V-type internal combustion engine, two-stage turbocharger system 12 comprises a first two-stage turbocharger system 12L provided for a first row of cylinders 16A-16F, and a second two-stage turbocharger system 12R provided for a second row of cylinders 16A-16F. As shown in FIG. 3, first and second two-stage turbocharger systems 12L, 12R are configured to correspond to each other, i.e. have substantially the same configuration as described above with respect to two-stage turbocharger system 12. Accordingly, the detailed description of two-stage turbocharger systems 12L, 12R will not be repeated, unless appropriate.

As shown in FIG. 3, the low-pressure stage turbochargers 26 of first two-stage turbocharger system 12L and second two-stage turbocharger system 12R have substantially the same configuration. Likewise, high-pressure stage turbochargers 28 of first two-stage turbocharger system 12L and second two-stage turbocharger system 12R also have substantially the same configuration, as described above.

Further, low-pressure stage turbochargers 26 of first two-stage turbocharger system 12L and second two-stage turbocharger system 12R are mounted symmetrically with respect to a central symmetry plane defined by the vertical direction Z and the longitudinal direction L. On the other hand, in the example shown in FIG. 3, high-pressure stage turbochargers 28 of first two-stage turbocharger system 12L and second two-stage turbocharger system 12R overlap at least partially when viewed in the plan view of internal combustion engine 10. This allows for a more compact arrangement of the two-stage turbocharger systems 12L, 12R in the transverse direction X, thereby reducing the total width of the system.

As shown in FIG. 3, each low-pressure stage turbocharger 26 includes an inlet 60 through which intake air is supplied to compressor $C_L$. The supplied intake air is compressed and supplied to first charge air coolers 30 via compressor connection 34. Namely, the pre-compressed charge air enters first charge air cooler 30 from the side of engine block 10 and exits first charge air cooler 30 on the opposite side in the axial direction L. From an outlet of first charge air cooler 30, the pre-cooled, pre-compressed intake air is supplied to high-pressure stage turbocharger 28, where the intake air is further compressed, and the compressed intake air is then supplied from an outlet of high-pressure stage turbocharger 28 to intake manifold 22 for one row of cylinders 16A-16F.

After combustion, hot exhaust gas is received from the corresponding exhaust manifold 24 and enters high-pressure stage turbocharger 28 to drive the turbine of the same. From a turbine outlet of high-pressure stage turbocharger 28, the exhaust gas is supplied to an inlet of the turbine $T_L$ of low-pressure stage turbocharger 26 via a turbine connection 35. Finally, the exhaust gas exits low-pressure stage turbocharger 26 via outlets 66 of turbines $T_L$.

Figure 4:
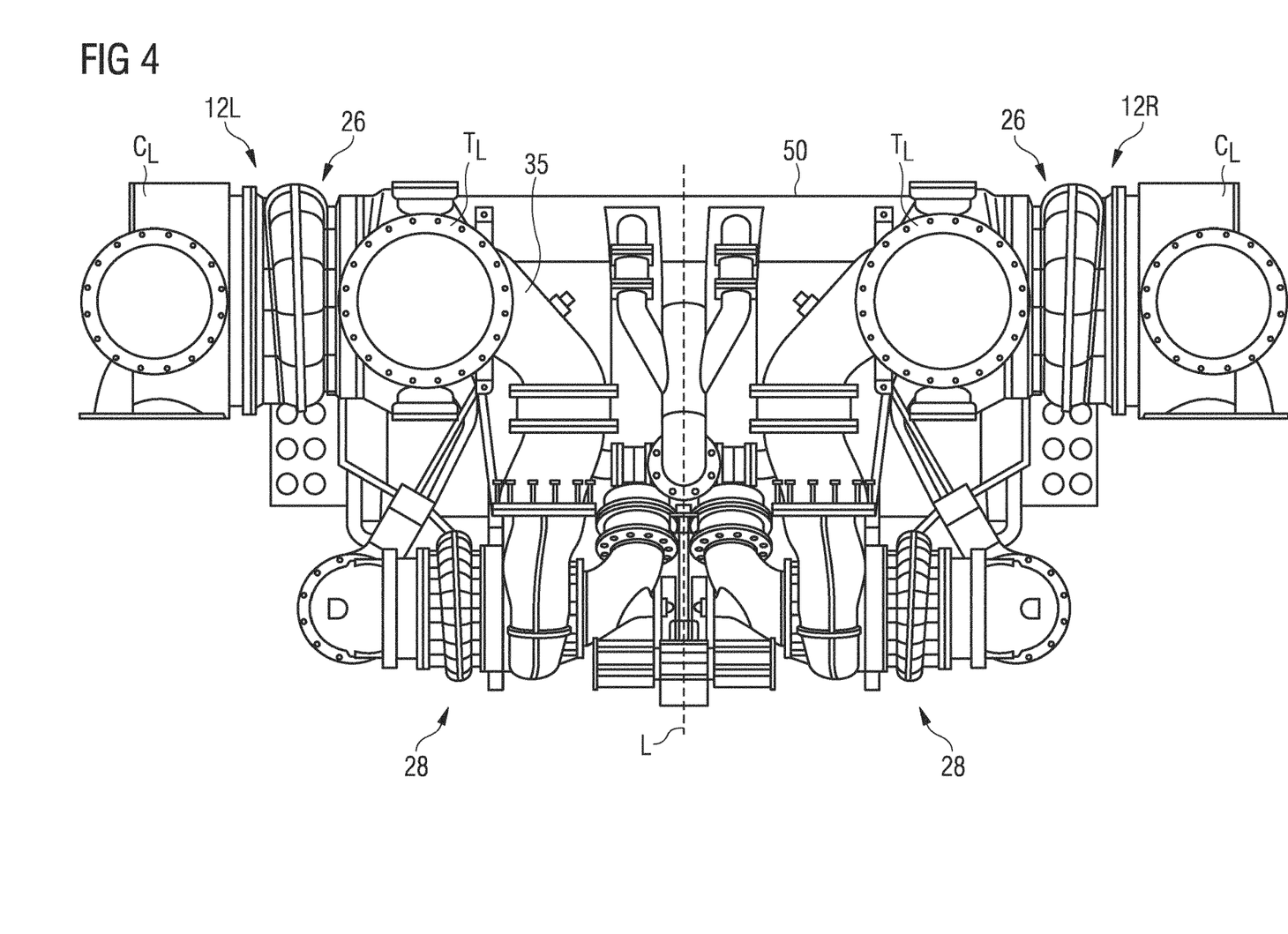
FIG. 4 is a plan view of a two-stage turbocharger system in accordance with the present disclosure.

FIG. 4 shows a schematic plan view of another embodiment of two-stage turbocharger system 12 applied to a V-type internal combustion engine. In the embodiment shown in FIG. 4, high-pressure stage turbochargers 28 of first two-stage turbocharger system 12L and second two-stage turbocharger system 12R are mounted/arranged symmetrically with respect to the central symmetry plane defined by the vertical direction Z and longitudinal direction L. Otherwise, the configuration is essentially the same as that which was described above with respect to FIG. 3. It will be readily appreciated that the configuration shown in FIG. 4 allows for a simplification of the two-stage turbocharger system, as the same pipe connections can be used on both sides of the system. Further, the center of gravity and/or weight distribution of the system can be further optimized. In addition, the system and its components are easier to mount, and a lever arm of the mounting structure can be reduced.

Although in the embodiments described above both low-pressure stage turbochargers 26 and high-pressure stage turbochargers 28 extend in the transverse direction X perpendicular to the longitudinal direction L, it will be readily appreciated that, in other embodiments, one or more of said turbochargers may extend at an angle with respect to longitudinal direction L, or along the same. This may further reduce the total width of the system, and it may also serve to shift the center of gravity to a desired position, for example, in the longitudinal direction L.

Further, while it has been described above that first charge air cooler 30 is disposed below second charge air cooler 32, it will be appreciated that in other embodiments first charge air cooler 30 may be disposed above second charge air cooler 32. Likewise, the flow direction of air inside the respective charge air coolers may be reversed. In this respect, it is noted that "flow direction" of the air in the respective charge air coolers refers to the direction from the inlet of the charge air cooler to the outlet of the same, regardless of the direction of the charge air inside the charge air cooler.

Although in the embodiments described above both the respective charge air coolers 30, 32 and the respective turbochargers 26, 28 are mounted on engine block 10 via mounting structure 50, it will be appreciated that, in other embodiments, one or more of said components may be directly mounted to engine block 10, if desired.

INDUSTRIAL APPLICABILITY

Herein, the term "internal combustion engine" may refer to internal combustion engines which may be used as main or auxiliary engines of stationary power providing systems such as power plants for production of heat and/or electricity as well as in ships/vessels such as cruiser liners, cargo ships, container ships, and tankers. Fuels for internal combustion engines may include gaseous fuel, diesel oil, marine diesel oil, heavy fuel oil, alternative fuels or a mixture thereof.

Examples of internal combustion engines for the herein disclosed configuration of a two-stage turbocharger system include medium speed internal combustion engines, for example, inline and V-type engines of the series M20, M25, M32, M34, M43, M46 manufactured by Caterpillar Motoren GmbH & Co. KG, Kiel, Germany, operated in a range of 500 to 1000 rpm.

Although the preferred embodiments of this invention have been described herein, improvements and modifications may be incorporated without departing from the scope of the following claims.

The invention claimed is:

1. An internal combustion engine, comprising:
an engine block extending along a longitudinal direction and having a first end side and a second end side opposite to the first end side in the longitudinal direction; and
a two-stage turbocharger system comprising:
a low-pressure stage turbocharger mounted at the first end side of the engine block and comprising a first turbine and a first compressor configured for pre-compressing charge air during operation of the internal combustion engine,
a high-pressure stage turbocharger mounted at the first end side of the engine block and comprising a second turbine and a second compressor configured for compressing the pre-compressed charge air during operation of the internal combustion engine,
a first charge air cooler fluidly connected to an outlet of the first compressor and an inlet of the second compressor, and
a second charge air cooler fluidly connected to an outlet of the second compressor, wherein the first charge air cooler and the second charge air cooler are mounted at the first end side of the engine block so as to overlap at least partially in a plan view of the internal combustion engine, and wherein the first charge air cooler and the second charge air cooler each include a box-shaped housing with a long side extending in a transverse direction perpendicular to the longitudinal direction.

2. The internal combustion engine of claim 1, further comprising a mounting structure mounted at the first end side of the engine block, the first charge air cooler and the second charge air cooler being mounted at the first end side of the engine block via the mounting structure.

3. The internal combustion engine of claim 2, wherein the mounting structure includes a rack configured to receive the first charge air cooler and the second charge air cooler from the side of the mounting structure opposite to the first end side of the engine block.

4. The internal combustion engine of claim 2, wherein the low-pressure stage turbocharger and the high-pressure stage turbocharger are mounted on an upper side of the mounting structure.

5. The internal combustion engine of claim 1, wherein at least one of the low-pressure stage turbocharger and the high-pressure stage turbocharger extends substantially perpendicular to the longitudinal direction.

6. The internal combustion engine of claim 1, wherein the second charge air cooler is disposed above the first charge air cooler.

7. The internal combustion engine of claim 1, wherein a flow direction of the pre-compressed charge air in the first charge air cooler is opposite to a flow direction of the compressed charge air in the second charge air cooler.

8. The internal combustion engine of claim 1, wherein a flow direction of the pre-compressed charge air in the first charge air cooler is away from the engine block.

9. The internal combustion engine of claim 1, wherein a flow direction of the compressed charge air in the second charge air cooler is towards the engine block.

10. The internal combustion engine of claim 1, wherein the internal combustion engine includes a first row of cylinders and a second row of cylinders arranged in parallel along the longitudinal direction, wherein the two-stage turbocharger system is a first two-stage turbocharger system provided for the first row of cylinders, wherein a second two-stage turbocharger system corresponding to the first two-stage turbocharger system is provided for the second row of cylinders, and wherein the high-pressure stage turbochargers of the first two-stage turbocharger system and the second two-stage turbocharger system overlap at least partially when viewed in the plan view of the internal combustion engine.

11. The internal combustion engine of claim 10, wherein the low-pressure stage turbochargers of the first two-stage turbocharger system and the second two-stage turbocharger system have substantially the same configuration, and/or wherein the high-pressure stage turbochargers of the first two-stage turbocharger system and the second two-stage turbocharger system have substantially the same configuration.

12. The internal combustion engine of claim 10, wherein at least the low-pressure stage turbochargers of the first two-stage turbocharger system and the second two-stage turbocharger system are mounted symmetrically with respect to a central symmetry plane defined by the vertical direction and the longitudinal direction.

13. The internal combustion engine of claim 12, wherein the high-pressure stage turbochargers of the first two-stage turbocharger system and the second two-stage turbocharger system are mounted symmetrically with respect to the central symmetry plane.

* * * * *